United States Patent [19]

Kiefer

[11] Patent Number: 4,679,444

[45] Date of Patent: Jul. 14, 1987

[54] INSTRUMENT FOR MEASURING THE COHESION FORCE IN DENTAL CONE CROWNS

[75] Inventor: Silvan Kiefer, Pforzheim, Fed. Rep. of Germany

[73] Assignee: Fried. Krupp Gesellschaft mit beschränkter Haftung, Essen, Fed. Rep. of Germany

[21] Appl. No.: 734,170

[22] Filed: May 15, 1985

[30] Foreign Application Priority Data

May 18, 1984 [DE] Fed. Rep. of Germany ....... 3418503

[51] Int. Cl.⁴ .................................................. G01L 5/00
[52] U.S. Cl. ..................................... 73/827; 73/862.62
[58] Field of Search .................... 73/862.62, 818, 821, 73/827; 279/2 R

[56] References Cited

U.S. PATENT DOCUMENTS

| | | | |
|---|---|---|---|
| 2,612,042 | 9/1952 | Clarke | 73/862.62 |
| 2,728,992 | 1/1956 | Frey | 33/148 R X |
| 3,665,925 | 5/1972 | Dersookian | 128/323 |
| 3,718,039 | 2/1973 | Bacon et al. | |

FOREIGN PATENT DOCUMENTS 2750258 7/1980 Fed. Rep. of Germany .
1226170 3/1971 United Kingdom .
1269143 4/1972 United Kingdom .

Primary Examiner—Jerry W. Myracle
Attorney, Agent, or Firm—Spencer & Frank

[57] ABSTRACT

An instrument for measuring the cohesion force between two interconnected components, such as inner and outer dental cone crowns, comprises a housing adapted to be manually grasped; a scale mechanism including a linearly extending helical spring accommodated in the housing and an indicator for displaying the extent of compression or expansion of the spring; and a divider-like gripper attached to one end of the spring and arranged for displacement relative to the housing. The gripper clamps one of the interconnected components, whereby upon pulling apart the two components, the indicator shows the extent of expansion of the helical spring for determining the pulling force exerted on the components at the moment of separation thereof.

5 Claims, 2 Drawing Figures

# INSTRUMENT FOR MEASURING THE COHESION FORCE IN DENTAL CONE CROWNS

BACKGROUND OF THE INVENTION

This invention is in the field of dentistry and relates in particular to a measuring instrument for determining the cohesion force in two-part cone crowns.

In dentistry, cone crowns permit a firm connection of a partial, removable denture portion to the remaining teeth. Such cone crowns are formed of an outer crown and an inner crown. The latter is inserted on an appropriately filed remaining tooth and is affixed thereto. On its outer face, the inner crown has the positive shape of a cone while the outer crown has a corresponding negative conical inner surface. The cohesion force between the inner and outer crowns may be influenced by the selection of the cone angle.

As concerns the cohesion force between the inner and outer crowns, an optimal value is sought between two contradictory requirements. On the one hand, the cone crown should firmly sit while being worn which would require a small cone angle. On the other hand, it is a desideratum that the outer crown be easily removable which, in turn, calls for a sufficiently large cone angle.

Tests have shown that the cohesion force between the inner and outer crowns should be approximately 3–5N. Heretofore, the cohesion force has been determined exclusively empirically by holding the inner crown firmly with cone pliers and then pulling off the outer crown manually.

German Pat. No. 2,750,258 discloses a frictional measuring instrument for sleeve crowns, including pliers which may be inserted into the crown sleeve and with which the crown sleeve is pulled from the crown to determine the frictional forces. This known measuring instrument further has a spring scale including an inner tube, an outer tube and a tension spring as well as a removable detent mechanism which prevents the inner tube from sliding back into the outer tube when the tensioning force exceeds the frictional force retaining the sleeve in the crown and the sleeve is thus removed from the crown.

SUMMARY OF THE INVENTION

It is an object of the invention to provide an improved instrument of the above-outlined type with which not only the cohesion force between the inner and outer crowns may be measured with great accuracy but which is also adapted to press the inner crown into the outer crown with a defined pressing force.

This object and others to become apparent as the specification progresses, are accomplished by the invention, acccording to which, briefly stated, the spring scale comprises a linearly extending helical spring which can serve as a tension spring and as a compression spring and which has a movable end carrying a divider-like gripping device whose legs may be moved towards or away from one another by means of a screw turnable by a knurled wheel.

DESCRIPTION OF THE PREFERRED EMBODIMENT

Figure 1:
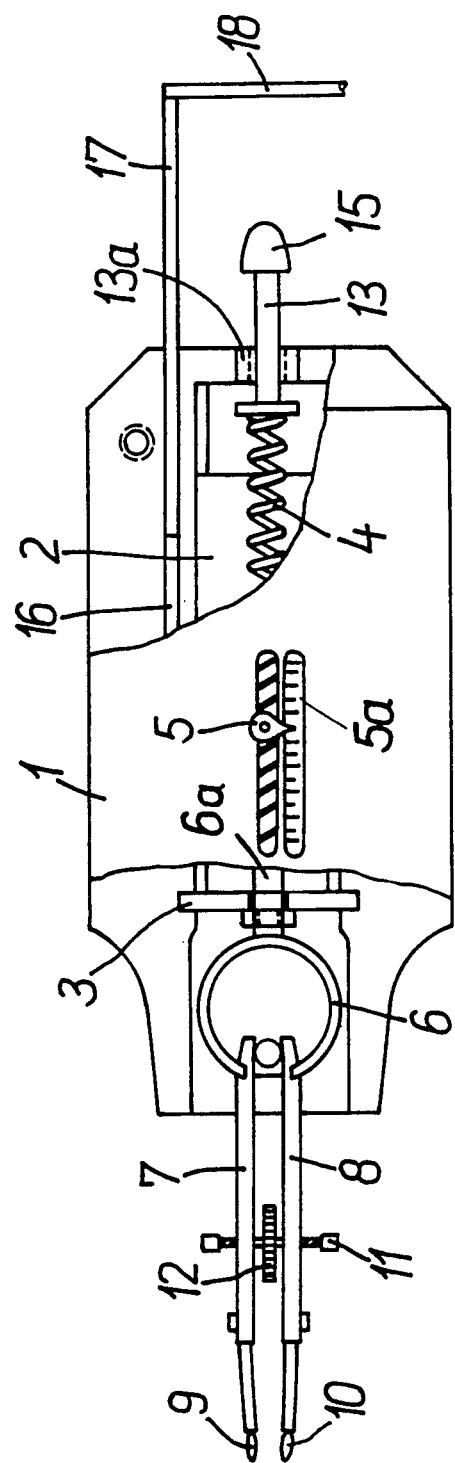
FIG. 1 is a partially broken-away, elevational view of a preferred embodiment of the invention.

Turning to FIG. 1, the instrument shown therein comprises a handle part 1 supporting the measuring instrument proper. The measuring instrument comprises a spring scale having a housing 2 which is fixedly connected with the outer casing (handle) 1 by means of a connecting part 3 or a securing screw 3a (FIG. 2).

The movable part of the spring scale comprises a spring 4 and a pointer 5 which is connected with the spring 4 and which, at the outside of the housing 1 slides along a scale 5a affixed to the housing 1 to display the extent of the expansion or compression of the spring 4. The left end (as viewed in FIG. 1) of the spring 4 is attached to a stem 6a which is slidale through an opening in the connecting part 3 and which is affixed to an intermediate member 6, constituted by a resilient split ring. The latter supports a gripping device which has essentially a divider-like configuration and includes two legs 7 and 8 terminating in grasping tips 9 and 10. The distance between the two grasping tips 9 and 10 which, in order to increase their cohesion force, has a diamond layer, may be set by means of a threaded spindle 11 engaging the legs 7 and 8 and carrying, affixed therto, a knurled wheel 12.

The instrument according to the invention further has a device for pressing an inner crown into the outer crown with a determined pressing force. The pressing device of the FIG. 1 embodiment comprises a plunger 13 which is guided for longitudinal sliding motion in a guide sleeve 13a and is engaged by the right end (as viewed in FIG. 1) of the spring 4 to thus be exposed to the force thereof. The plunger 13 has a conical head 15 which is preferably of hard rubber and by means of which the inner crown may be pressed into the outer crown. In order to ensure that the inner crown is not forced into misalignment with respect to the outer crown by virtue of a lateral pressing force, there is provided an additional holding arrangement comprising a rail 17 slidable in a bore 16 and a transverse member 18 which is secured to the rail 17 and which may be removably affixed to a work table. The rail 17 thus ensures that the device is guided precisely parallel to the plunger 13, that is, parallel to the direction of the force to be exerted by the head 15 on the inner crown. The force with which the head 15 presses the inner crown into the outer crown is indicated by the pointer 5 on the scale 5a.

Figure 2:
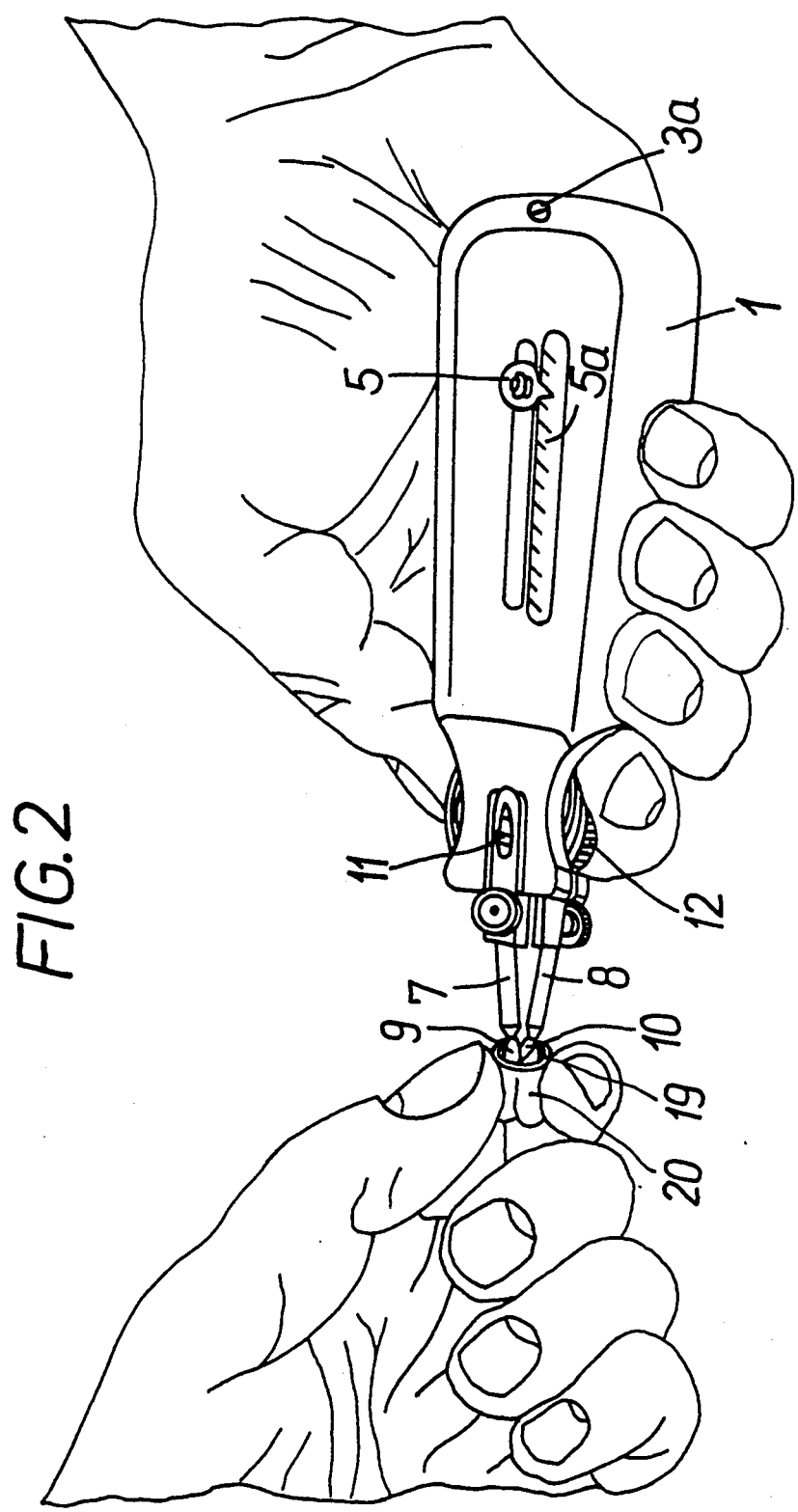
FIG. 2 is a perspective view of another preferred embodiment, depicted in use.

Turning now to FIG. 2, for measuring the cohesion force between an inner crown 19 and an outer crown 20, the inner crown 19 is engaged by the grasping tips 9 and 10 of the respective legs 7 and 8 and is immobilized by moving apart the grasping tips 9 and 10 by the tensioning spindle 11 by rotating the knurled wheel 12 such that the inner crown 19 is clamped by the grasping tips 9 and 10. Thereafter, the outer crown and the inner crown are manually pulled apart. The force which is shown by the pointer 5 on the scale 5a at the moment of separation of the inner crown 19 and the outer crown 20 indicates the cohesion force between the inner and outer crowns.

As an alternative to the pressing arrangement 13, 15 shown in FIG. 1, the right end of the spring 4 may be stationarily attached to the end face of the spring housing 2 and further, in the relaxed state of the spring 4 the pointer 5 assumes a zero position at about the middle of the scale 5a. The pressing of the inner crown 19 into the outer crown 20 is effected by the gripping mechanism 7-10. Thus, in such an arrangement, which is incorporated in the embodiment shown in FIG. 2, the cohesion force with which the inner and outer crowns may be read to the left of a zero point on the scale 5a, while the pressing force with which the inner and outer crowns are forced into engagement by the gripping mechanism 7-10 of the instrument is indicated to the right of the zero point of the scale 5a.

It will be understood that the above description of the present invention is susceptible to various modifications, changes and adaptations, and the same are intended to be comprehended within the meaning and range of equivalents of the appended claims.

What is claimed is:

1. An instrument for measuring the cohesion force between a dental outer crown and a dental inner crown connected to one another, comprising:
    (a) a housing adapted to be manually grasped;
    (b) scale means including a linearly extending helical spring means accommodated in said housing and indicator means for displaying the extent of compression or expansion of said spring;
    (c) a divider-like gripping means attached to one end of said spring means and arranged for displacement relative to said housing; said gripping means including means for clamping the gripping means to one of the interconnected crowns, whereby upon pulling apart the two components, said indicator means shows the extent of expansion of said helical spring means for determining the pulling force exerted on the inner and outer crowns at the moment of separation thereof; and
    (d) pressing means for forcing the inner and outer crowns into engagement with one another; said pressing means being attached to one end of said spring means and being arranged for displacement relative to said housing, whereby upon pressing together the inner and outer crowns, said indicator means shows the extent of compression of said helical spring means for determining the pressing force exerted on the inner and outer crowns.

2. An instrument as defined in claim 1, wherein said pressing means is constituted by said divider-like gripping means and further wherein an end of said spring means remote from the gripping means is affixed at least indirectly to said housing.

3. An instrument as defined in claim 1, wherein said pressing means comprises a plunger attached to an end of said spring means remote from said gripping means; said plunger having a head projecting from said housing and adapted to engage one of the components to be pressed together.

4. An instrument as defined in claim 1, wherein said divider-like gripping means includes two approximately parallel, spaced legs projecting beyond said housing, a threaded adjusting spindle interconnecting said legs and knurled wheel attached to said spindle for rotating said spindle to vary the distance between the two legs.

5. An instrument as defined in claim 4, said legs having first ends arranged to cooperate for gripping one of the interconnected crowns and second ends remote from said first ends; further comprising means for pivotally supporting said legs at the second ends thereof; said spindle interconnecting said legs at a location situated externally of said housing between said first ends and said second ends; said knurled wheel being situated externally of said housing.

* * * * *